May 17, 1932.  E. A. LARSSON  1,858,402
TROLLEY POLE DEVICE
Filed Sept. 11, 1930  2 Sheets-Sheet 2
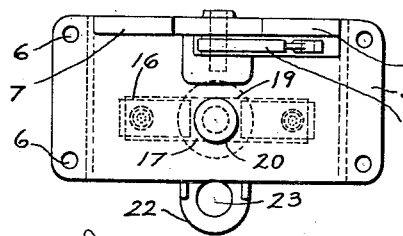
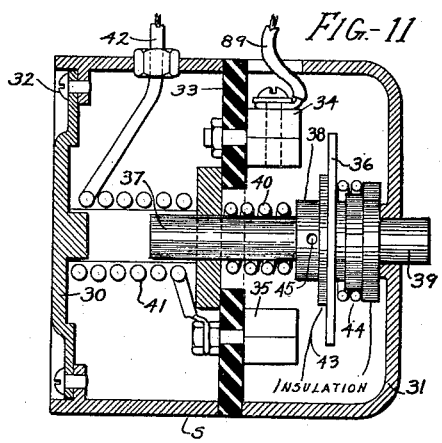
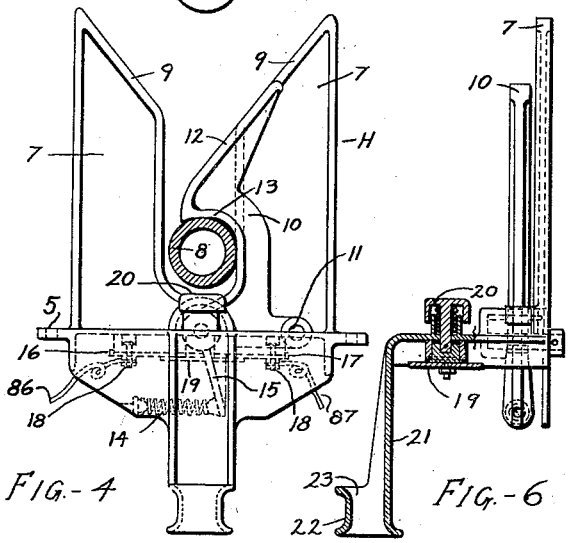
Inventor
ERNST A. LARSSON
By
Attorney Patented May 17, 1932

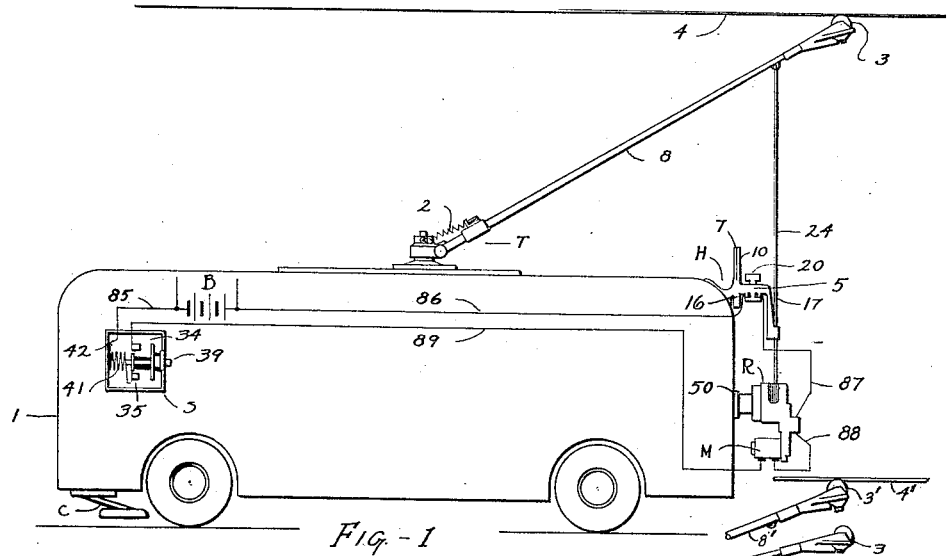

1,858,402

UNITED STATES PATENT OFFICE

ERNST A. LARSSON, OF MANSFIELD, OHIO, ASSIGNOR TO THE OHIO BRASS COMPANY, OF MANSFIELD, OHIO, A CORPORATION OF NEW JERSEY

TROLLEY POLE DEVICE

Application filed September 11, 1930. Serial No. 481,146.

My invention relates to trolley control mechanism in connection with moving vehicles which may derive their motive power exclusively or partially from overhead conductors.

One of the objects of my invention is to provide an apparatus and system for retracting one or both of the trolley poles used with trackless trolleys or other vehicles using a trolley pole.

Another object of my invention is to make the apparatus and system controllable by an operator on or within the vehicle at will.

Another object of my invention is to render the system and retrieving mechanism automatic in its operation to catch and draw the pole downward should the collector accidentally leave the trolley wire.

Other objects of my invention will be disclosed through the description and drawings of my invention to follow.

It might be well to say here that a trolley bus or other vehicle may operate between and through towns and use the double trolley between towns but the single trolley system through the town, and therefore a system and mechanism by which the operator may at will retract one pole when the single trolley system is met and do so without loss of time is desirable. My invention will meet such requirements.

My invention resides in the new and novel construction, combination and relation of the various parts and mechanism herein described and shown in the accompanying drawings.

In the drawings:—

Fig. 1 is a schematic view showing the relative arrangement of the various parts of my invention with respect to each other and to the vehicle and the circuit connecting the various parts when the trolley pole to be retracted is in normal operating position, that is, the current collector in contact with the trolley wire.

Fig. 2 is a view similar to Fig. 1 in which the operator has reached the end of the double trolley and has closed the switch and set the system and mechanism in operation and one of the two trolley poles with which the vehicle is usually equipped is descending and partially down. The other trolley remains in its normal operative position as later explained.

Fig. 3 shows a view similar to Fig. 2 in which the retracting trolley pole has reached its lowest position and having automatically opened the control circuit whereby its movement downwardly is checked even with the operator's switch closed.

Fig. 4 is a face view in elevation of the device to hold the trolley pole in its lower position and automatically open the circuit when the pole has reached a predetermined position.

Fig. 5 is a top view of Fig. 4.

Fig. 6 is a side view of Fig. 4.

Fig. 7 is a face view in elevation of the retrieving mechanism with the cover to the clutch mechanism removed.

Fig. 8 is a sectional view on the line 8—8 of Fig. 7.

Fig. 9 is a partial view in partial section on the line 9—9 of Fig. 7 and shows the electro-magnetically operating part of a clutch for automatically engaging the retrieving mechanism and operating motor as later explained.

Fig. 10 is a partial view in section of the interlocking portion of the clutch taken on the line 10—10 of Fig. 7.

Fig. 11 is a view in partial section of the operator's control switch.

In the preferred embodiment of my invention I mount upon a vehicle 1 which may be a trolley bus or a street car, various mechanisms whereby the operator of the vehicle may at his will retract the one or more of the trolley poles. Upon the vehicle, preferably the roof, is mounted pivoted trolley pole mechanism T of the usual type and the pole being biased to move upwardly by means of the spring 2. If two poles are used they may be mounted side by side and the two are shown as in Figs. 2-3. The current collector 3 or 3' at the free end of the pole is arranged to contact with the trolley wire 4 or 4' respectively.

Mounted upon one end of the car is the hold down mechanism H and as shown in Figs.

4, 5 and 6 comprises a base portion 5 having holes 6 therein to receive bolts to secure the device to the vehicle bracket. Mounted upon the base 5 are upwardly projecting horns or guides 7 by means of which the trolley pole 8 is guided into position when it is moved to its lowered position. The guides 7 are fixed and have sloping edges 9. Pivotally mounted upon the base 5 is a movable latch 10 which pivots about the pintle 11 and has a sloping surface 12 engaged by the pole 8 and thereby moves the latch 10 about the pintle 11 as it descends. The latch 10 has a holding portion 13 engaged by the pole 8 thus holding the pole in its lowered position. The latch 10 is biased to its normal holding position by means of a spring 14 having one end fixed and the other end pressing against a lever arm 15 which is fixedly secured to the latch 10. It will be seen that as the latch moves about the pintle 11 that the arm 15 will be moved to the left thus further compressing the spring 14.

The hold down device H is provided with an automatic switch operated by the pole in its extremely lowered position and consists of contacts 16 and 17 which are fixedly secured to the base 5, but insulated therefrom and from each other and provided with cable terminals 18. The contacts 16 and 17 are normally connected by means of a movable contact 19 which is secured to a spring held plunger 20. When the pole 8 is brought to its lowest position it will contact with the plunger 20 forcing it downwardly against spring pressure and simultaneously with it the bridging contact 19 will be moved out of engagement with the contacts 16 and 17 thus breaking the otherwise normally closed connection therebetween.

Projecting outwardly and downwardly is a guide member 21 having a ferrule 22 with a passage 23 therethrough and through which the trolley rope 24 passes thus maintaining the rope in a reasonably fixed relation to the reeling mechanism below, during the raising and lowering of the trolley pole 8.

Mounted on the vehicle in some convenient position is a switch S under control of the operator and comprising a base 30 and a covering portion 31 held together by means of screws 32. Secured within the cover 31 is an insulating diaphragm 33 having mounted thereon contacts 34 and 35 which are normally insulated from each other, but may at will of the operator be electrically connected by means of the contact 36 which is mounted upon the plunger 37 and insulated therefrom by an insulating bushing 38. Projecting from the casing is a push button 39. The connector 36 is maintained in an open position by means of a spring 40 except when the system is set in operation.

Mounted within the casing 31 is a coil 41 having one end connected to the terminal 35 and the other end 42 extending through the casing for connection as later explained. The plunger 37 is preferably of soft iron and together with the coil 41 constitutes a solenoid arrangement which is such that when the button 39 is pressed the circuit through the switch will be closed and the plunger 37 moved manually into the coil 41 and when current flows therethrough the plunger 37 will be maintained in its depressed position so long as current flows through the coil 41 thus maintaining the contacts 34 and 35 connected, but as soon as the current ceases to flow through the coil 41 and it is de-energized the spring 40 will move the parts back to their normal open position.

The connector 36 is loosely mounted on the insulating collar 38 which is held to the iron core 37 by the through-pin 45 which projects sufficiently to support the insulating washer 43. The member 36 is yieldably held toward the pin 45 by means of the spring 44 which tends to yield when the member 36 engages with the members 34 and 35.

Mounted upon the vehicle is a trolley retrieving device which may be a modification of standard devices now on the market and which may be of the constructions shown in Gierding Patent 1,262,037 or Starky 1,262,128 both dated April 9, 1918, Hollis 1,056,742 dated March 18, 1913 and Knutson 735,672 dated August 4th, 1903.

These devices in general comprise a support casting 50 by means of which the device is secured to the vehicle. A casing 51 encloses the usual operating mechanism comprising a shaft 52 upon which is rotatably mounted control mechanism 53 by means of which the retrieving spring 54 is automatically and operatively connected to the reel or drum 55 should the trolley collector leave the wire and suddenly spring upwardly, to rotate the reel and wind up the rope 24. I have not shown or described all of the details in connection with the construction and operation of the mechanism 53 as the specific construction does not involve my invention and several such devices are shown and described in the patents referred to and several such standard devices have been on the market for several years and are being sold in quantities.

The reel 55 under normal conditions of operation is free to rotate in either direction as the collector raises or lowers due to variation in the height of the trolley wire and the rotation of the reel in an unwinding direction is due to the pull upwardly of the trolley rope and the rotation in the winding direction is due to a tension spring 56 connected to the shaft 52 and to the reel 55 through the medium of the spring housing 57. The tension in the spring 56 is sufficiently great only to rotate the drum 55 to take up slack in the rope 24.

As before stated, it is desirable at times to withdraw the trolley collector from the wire and lower the pole other than through the automatic operation by the mechanisms 53 and 54. I provide in combination with the retrieving mechanism thus far described an electric motor M having a frame 58 which is secured to the retriever proper through the casing 59. Keyed upon the shaft of the motor is a pinion 60 which meshes with a gear 61 mounted to rotate within the bearing 62 and upon the shaft 63. Secured to the shaft 63 to rotate therewith is a gear 64 which meshes with an annular gear ring 65 which is secured to the spring housing 57 to rotate therewith. The spring housing 57 is secured to the reel 55 and rotates therewith. From this description thus far it will be noted that as the reel 55 rotates under the action of the rope or the spring 56, the housing 57 and gear 65 will rotate simultaneously therewith and with the gear 64 and the shaft 63. Also if the motor 58 operates, the pinion 60 and gear 61 will rotate.

In order to interlock the gearing such that when the motor is operated the reel will be operated, I provide an electro-magnetically operated clutch arrangement shown in Figs. 9 and 10 and comprising an electro-magnet having a slidable core 70 and the coil 71 with terminals 72 and 73. Pivotally mounted in the casing 59 is an arm 74 having a projecting part 75 which is engaged by the movable core 70 when the coil 71 is energized thus moving the arm 74 about its pivot whereby the end 75 will be moved in a direction away from the coil 71. The portion 76 of the armature 74 has mounted thereon an adjustable bolt 77 which is positioned opposite the longitudinal axis of the shaft 63. The shaft 63 has a recess in which is mounted a spring 66 and a screw 67 and a slidable member having a cross bar 68 which is arranged to be moved into slots 69 in the end of the shaft 63 and the end of the hub on the gear 61 when they register. This movement is brought about through the movement of the arm 74 under the influence of the energized coil 71 which will move the bolt 77 into contact with the member 68 thus pushing it inwardly with respect to the shaft 63 and slots 69 thus locking the shaft 63 and gear 61 together for simultaneous rotation. As later described the operation of the electromagnet 71 is substantially simultaneous with that of the rotation of the motor, consequently the slots 69 will be brought into registration if not already so thus permitting the interlocking of the shaft 63 and gear 61 through the medium of the member 68. The spring 66 tends to normally maintain the gear 61 and shaft 63 non-interlocked. When the coil 71 is de-energized the spring 66 will force the member 68 outwardly thus causing the arm 74 to pivot and the portion 75 will be moved toward the coil 71 thus moving the core 70 backwardly toward its normal position when the coil 71 is de-energized.

Having now described the various mechanisms which I employ I will describe the combined assembly of the various parts for operation. The trolley pole attachment T, the hold-down device H, the retriever R and its operating motor M and the switch S are mounted on the vehicle as represented in Figs. 1, 2 and 3. The switch S may be mounted wherever convenient for the operator. In order to utilize commercial motors which have been highly developed for such use as engine starters on motor cars I prefer to employ a 6 or 12 volt motor operated by a battery B which may be charged from the source of power such as the trolley wires 4 and 4'. The arrangements of the conductors which I am about to describe may, of course, be varied that is, the exact arrangement shown is not necessary as for instance, the battery B may be placed in the other conductor from the switch S or it may be placed in the conductor connecting the electro-magnetic clutch and the switch on the hold-down device also it will be noted that while I have shown the parts connected in series they may be connected in combined shunt and series, all of which will be well known to those skilled in the art after reading my disclosure.

In connecting up the various apparatus one end of the coil 41 is connected to the battery B by the conductor 85 and the other pole of the battery may be connected to the contact 16 of the hold-down device by the conductor 86. The contact 17 of the hold-down device may be connected to the contact 72 on the electro-magnetic clutch by the conductor 87 and the contact 73 of the electro-magnetic clutch is connected to the motor M by the conductor 88 and the other side of the motor is connected to the contact 34 of the switch S by the conductor 89.

It will be apparent that when the button 39 is pressed and the contacts 34 and 35 are connected current will flow from the battery B through the switch S and its coil 41 to and through the motor M then through the electro-magnetic clutch and its coil 71 and through the normally closed switch of the hold-down device and thence to the battery. This will cause an energization of the coil 41 which will automatically maintain the switch S closed and the motor M will rotate and simultaneously the coil 71 of the clutch will be energized and when the grooves 69 register the clutch bar 68 will automatically lock the motor to the reel 55 of the retriever R and the reel 55 will then be rotated to draw in the rope 24 and to draw down the pole 8. This rotation of the reel 55 will continue until the pole 8 engages with the button 20 when it will cause the circuit to be broken at the contacts 16 and 17. This will open the circuit and cut off current to the motor and cause the coil 41 to be de-energized and simultaneously the switch S will open and the the clutch coil 71 will be de-energized and the motor will be operatively disconnected from the reel 55 thus permitting the reel 55 to rotate freely and it will immediately begin to rotate in the opposite direction through the upward pull of the rope 24 due to the spring 2 and the upward movement of the pole 8 will continue until it is stopped by the latch 10 which it previously moved to one side automatically about the pivot 11 as the pole was lowered. The pole will now be held in its lowered position by the latch 10 and until it is released manually by the operator by moving the latch 10 about its pivot 11.

I have shown in Figs. 1, 2 and 3 only a single set of equipment R, M and H, but in trolley bus operation it is usual to have two overhead conductors 4 and 4' namely, a positive and negative because the busses operate on rubber tires and are quite insulated from the ground and also deviate from a fixed path. Therefore a single overhead trolley utilizing the ground as a return cannot be used unless the busses are operated along a track G and a shoe or ground contactor is employed which contacts with the rail G. In Fig. 1 the contactor C is shown raised and no track G is shown and represents the vehicle in operation between cities.

My arrangement is particularly adapted for use on trolley busses where they operate both in the country and city in that in the country the two overhead trolleys would be used contacting with the positive and negative wires respectively and when the city limits were reached the bus would continue through the city utilizing only one trolley as shown in Figs. 2 and 3 and in that case only one retriever equipment and one hold-down equipment would be required as the other trolley would be required as in the case of the operation of the present street cars, but while operating through the city streets the ground contactor C would of necessity be employed to contact with the rails G to complete the circuit through the car as a grounded circuit is employed as a rule in city operation and the busses would therefore be obliged to travel along the track substantially the same as street cars. The trolley 4 would probably be negative and the trolley 4' positive and track G negative.

Having described my invention, I claim:—

1. A system comprising a vehicle, a current collector mechanism pivotally mounted thereon and having means biased to raise the mechanism about its pivot point, a retrieving mechanism having a rotatable drum, an electric motor operatively connected to the drum to rotate the drum and electrically operated means to make such operative connection at will of the vehicle operator and means biased to break said operative connection, a flexible member connecting the collector mechanism and the drum to draw the collector mechanism downward when the motor rotates the drum in one direction, a hold down mechanism comprising a base having secured thereon guides for the collector mechanism and a movable latch biased to its latching position to engage and hold the collector mechanism down and a normally closed switching mechanism operated by the downward movement of the collector mechanism to control the operation of the electric motor when the pole has been lowered to a predetermined position, a normally open switch under control of the operator and a circuit connecting the switch, the hold down mechanism and the electric motor in series and to a source of power such that when the normally open switch is closed the motor will operate and the operative connection between the motor and drum be made to rotate the drum to draw the collector mechanism downward until it engages the normally closed switch and opens the same to open the operating circuit and release the drum from the motor.

2. A system comprising a vehicle, a current collector mechanism pivotally mounted thereon and having means biased to raise the mechanism about its pivotal point, a retrieving mechanism having a rotatable drum, an electric motor, electrically controlled mechanism to connect the motor to the drum when energized and means biased to break the said motor connection when the mechanism is de-energized, a member connecting the collector mechanism and the drum to draw the collector mechanism downward when the drum is rotated in one direction, a hold down mechanism comprising a base having a movable latch thereon normally biased to its latching position to engage and hold the collector mechanism in its lowered position, a normally closed switch associated with the hold down mechanim and engaged by the collector mechanism in its lowered position to open the switch to de-energize the motor, a normally open switch under control of the vehicle operator and conductors connecting the said switches, motor and electrically controlled mechanism to a source of power, the system operating upon the operator closing the normally open switch to energize the motor and said electrically controlled mechanism to rotate the drum and draw the collector mechanism downward until it contacts with the normally closed switch and opens the same and de-energizes the electrically controlled mechanism and releases the drum to permit the collector mechanism to move upwardly into engagement with the latch mechanism.

3. A system comprising a vehicle, a pivoted trolley pole and collector normally biased to move upwardly about its pivotal point, a retrieving mechanism having a drum and a spring to automatically rotate the drum in one direction under predetermined conditions and an electric motor to rotate the drum in the same direction under manually controlled conditions, electro-magnetically controlled mechanism to throw the motor into operative relation with the drum, means connecting the drum and trolley pole to lower the pole, a manually operated switch connecting the motor and electro-magnetically controlled mechanism to a source of power to energize the motor and mechanism to rotate the drum and lower the pole and conductors effecting such connections, a switch automatically operated by the trolley pole when the pole has reached a predetermined lowered position to de-energize the electro-magnetically controlled mechanism to release the drum.

4. A system comprising a vehicle, a pivoted trolley pole and collector normally biased to move upwardly about its pivotal point, a retrieving mechanism having a drum and a spring to automatically rotate the drum in one direction under predetermined conditions and an electric motor to rotate the drum in the same direction under manually controlled conditions, electro-magnetically controlled mechanism to throw the motor into operative relation with the drum, means connecting the drum and trolley pole to lower the pole, a manually operated switch connecting the motor and electro-magnetically controlled mechanism to a source of power to energize the motor and mechanism to rotate the drum and lower the pole and conductors effecting such connections, a switch automatically operated by the trolley pole when the pole has reached a predetermined lowered position to de-energize the electro-magnetically controlled mechanism to release the drum, the manually operated switch provided with electro-magnetically operated means to hold the switch closed while the motor is energized.

5. A system comprising a vehicle, a pivoted trolley pole and collector normally biased to move upwardly about its pivotal point, a retrieving mechanism having a drum and a spring to automatically rotate the drum in one direction under predetermined conditions and an electric motor to rotate the drum in the same direction under manually controlled conditions, electro-magnetically controlled mechanism to throw the motor into operative relation with the drum, means connecting the drum and trolley pole to lower the pole, a manually operated switch connecting the motor and electro-magnetically controlled mechanism to a source of power to energize the motor and mechanism to rotate the drum and lower the pole and conductors effecting such connections, a switch automatically operated by the trolley pole when the pole has reached a predetermined lowered position to de-energize the electro-magnetically controlled mechanism to release the drum, the manually operated switch provided with electro-magnetically operated means to hold the switch closed after being closed while the automatically operated switch is closed.

6. A system comprising a vehicle, a pivoted trolley pole and collector normally biased to move upwardly about its pivotal point, a retrieving mechanism having a drum and a spring to automatically rotate the drum in one direction under predetermined conditions and an electric motor to rotate the drum in the same direction under manually controlled conditions, electro-magnetically controlled mechanism to throw the motor into operative relation with the drum, means connecting the drum and trolley pole to lower the pole, a manually operated switch connecting the motor and electro-magnetically controlled mechanism to a source of power to energize the motor and mechanism to rotate the drum and lower the pole and conductors effecting such conditions, a switch automatically operated by the trolley pole when the pole has reached a predetermined lowered position to de-energize the electro-magnetically controlled mechanism to release the drum, the manually operated switch provided with means to hold the switch closed when the said automatically operated switch is closed and to automatically open the manually operated switch when the said automatically operated switch is opened.

7. A system comprising a vehicle, a pivoted trolley pole provided with a current collector normally biased to move upward about its pivotal point, a retriever mechanism having a drum and an electric motor to rotate the drum, a source of electric power in the vehicle, a manually operated switch to control the operation of the electric motor, conductors connecting the electric motor and the source of power and the switch, a flexible connector between the drum and trolley pole to retract the pole and electro-magnetically operated means to connect and disconnect the electric motor to and from said drum at will of the vehicle-operator.

8. A system comprising a vehicle, a pivoted trolley pole provided with a current collector normally biased to move upward about its pivotal point, a retriever mechanism having a drum and an electric motor to rotate the drum, a source of electric power in the vehicle, a manually operated switch to control the operation of the electric motor, conductors connecting the electric motor and the source of power and the switch, a flexible connector between the drum and trolley pole to retract the pole and electro-magnetically operated means under control of the switch to connect and disconnect the electric motor to and from said drum at will of the vehicle-operator.

9. A system comprising a vehicle, a pivoted trolley pole provided with a current collector normally biased to move upward about its pivotal point, a retriever mechanism having a drum and an electric motor to rotate the drum, a source of electric power in the vehicle, a manually operated switch to control the operation of the electric motor, conductors connecting the electric motor and the source of power and the switch, a flexible connector between the drum and trolley pole to retract the pole and electro-magnetically operated means to connect and disconnect the electric motor to and from said drum at will of the vehicle-operator, the retriever having a spring to automatically rotate the drum in the same direction as that by the motor but independently of the motor.

10. A system comprising a vehicle, a pivoted trolley pole provided with a current collector normally biased to move upward about its pivotal point, a retriever mechanism having a drum and an electric motor to rotate the drum, a source of electric power in the vehicle, a manually operated switch to control the operation of the electric motor, conductors connecting the electric motor and the source of power and the switch, a flexible connector between the drum and trolley pole to retract the pole and electro-magnetically operated means to connect and disconnect the electric motor to and from said drum at will of the vehicle-operator, the retriever having a spring to rotate the drum to keep the slack out of the flexible connector when the drum is rotating free from the motor.

11. The combination with a trolley retriever having a rope drum and pull down spring to automatically rotate the drum in a rope winding direction when suddenly rotated in the other direction of electrically operated means normally out of operative relation with the drum to rotate the drum in the rope winding direction at will of an operator, means under control of the operator to operatively connect said motor to the drum and a source of power connected to the motor to operate same.

12. The combination with a trolley retriever having a rope drum and pull down spring to automatically rotate the drum in a rope winding direction when suddenly rotated in the other direction of electrically operated means normally out of operative relation with the drum to rotate the drum in the rope winding direction at will of an operator, electrically controlled means under control of the operator to operatively connect said motor to the drum and a source of power connected to the motor to operate same.

13. A system comprising a vehicle, positive and negative current collectors, devices pivotally mounted on the vehicle, retriever mechanism operatively connected to the negative collector device to retract the device automatically under predetermined conditions and manually controlled and electrically operated device to operate the retriever mechanism at will of an operator, manually operated means remote from the retriever mechanism to control the operation of the electrically operated device and connected to said electrically operated device and means on the vehicle independent of the negative current collector to supply a negative connection between the vehicle and source of current supply while the positive current collector connects to the positive side of the source of supply.

14. In a system comprising in combination a vehicle, a trolley pole and collector thereon, a retriever to lower the trolley pole automatically under predetermined conditions and at will of an operator under other conditions, means remote from the retriever and electrically connected thereto and operable by the operator to control the second said operation of the retriever and means connecting the retriever and pole.

15. An electrically operated vehicle having in combination therewith a trolley pole biased to pivot upwardly and a current collector thereon to contact with an overhead conductor, a retriever mounted on the vehicle adjacent one end and having a drum connected to the pole by a flexible connector, a spring to rotate the drum in a rope winding direction under predetermined conditions to lower the pole and an electric motor to rotate the drum to lower the pole under other predetermined conditions and the spring and the electric motor functioning independently of each other, electrically operated means to connect and disconnect the motor operatively to or from the drum at will of an operator, manually operated means electrically connected to a source of current supply on the vehicle and to the electric motor and electrically operated means to supply current thereto to operate the motor and the drum in a rope winding direction.

16. An electrically operated vehicle having in combination therewith a trolley pole biased to pivot upwardly and a current collector thereon to contact with an overhead conductor, a retriever mounted on the vehicle adjacent one end and having a drum connected to a pole by a flexible connector, a spring to rotate the drum in a rope winding direction under predetermined conditions to lower the pole and an electric motor to rotate the drum to lower the pole under other predetermined conditions and the spring and the electric motor functioning independently of each other, electrically operated means to connect and disconnect the motor operatively to or from the drum at will of an operator, manually operated means electrically connected to a source of current supply on the vehicle and to the electric motor and electrically operated means to supply current thereto to operate the motor and the drum in a rope winding direction and means to automatically cut off the current supply to the motor after the pole has lowered a predetermined amount.

17. An electrically operated vehicle having in combination therewith a pivotally mounted trolley pole and current collector biased to a raised position and a retriever having a drum flexibly connected to the trolley pole to lower same, an electric motor to rotate the drum in a rope winding direction, a source of power on the vehicle, a switch operable by the operator from his station within the vehicle and remote from the retriever and conductors connecting the current supply and the switch and the motor to supply current to the motor.

18. An electrically operated vehicle having in combination therewith a pivotally mounted trolley pole and current collector biased to a raised position and a retriever having a drum flexibly connected to the trolley pole to lower same, an electric motor to rotate the drum in a rope winding direction, a source of power on the vehicle, a switch operable by the operator from his station within the vehicle and remote from the retriever and conductors connecting the current supply and the switch and the motor to supply current to the motor and electrically operated means to connect the motor and drum when the said switch is closed and receiving current from the said source of supply.

19. An electrically operated vehicle having in combination therewith a pivotally mounted trolley pole and current collector biased to a raised position and a retriever having a drum flexibly connected to the trolley pole to lower same, an electric motor to rotate the drum in a rope winding direction, a source of power on the vehicle, a switch operable by the operator from his station within the vehicle and remote from the retriever and conductors connecting the current supply and the switch and the motor to supply current to the motor, means on the switch to hold it closed after being closed by the operator and means to automatically open the switch after the pole has been lowered a predetermined amount.

20. An electrically operated vehicle having in combination therewith a pivotally mounted trolley pole and current collector biased to a raised position and a retriever having a drum flexibly connected to the trolley pole to lower same, an electric motor to rotate the drum in a rope winding direction, a source of power on the vehicle, a switch operable by the operator from his station within the vehicle and remote from the retriever and conductors connecting the current supply and the switch and the motor to supply current to the motor and means to automatically prevent the flow of current to the motor after the pole has lowered a predetermined amount.

In testimony whereof I affix my signature.

ERNST A. LARSSON.